United States Patent [19]

Ban et al.

[11] 4,200,205
[45] Apr. 29, 1980

[54] FLUID RESERVOIRS FOR TANDEM MASTER CYLINDERS

[75] Inventors: Masashi Ban; Tomio Tachino, both of Kariya; Jiro Kizaki, Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 929,178

[22] Filed: Jul. 28, 1978

[30] Foreign Application Priority Data

Jul. 30, 1977 [JP] Japan .................................. 52-92051

[51] Int. Cl.² ........................ B65D 85/00; B60T 11/00
[52] U.S. Cl. .................................. 220/20.5; 188/345
[58] Field of Search .................. 220/20, 20.5; 60/477; 188/345, 352; D12/180

[56] References Cited

U.S. PATENT DOCUMENTS 4,004,707  1/1977  Snyder ........................... 220/85 B X

FOREIGN PATENT DOCUMENTS 1024596   3/1966  United Kingdom .
1096007  12/1967  United Kingdom .
1164070   9/1969  United Kingdom .
1236556   6/1971  United Kingdom .
1245126   9/1971  United Kingdom .
1293103  10/1972  United Kingdom .
1311226   3/1973  United Kingdom .
1447126   8/1976  United Kingdom .
1472814   5/1977  United Kingdom .

Primary Examiner—Steven M. Pollard
Attorney, Agent, or Firm—Finnegan, Henderson, Farabow, Garrett & Dunner

[57] ABSTRACT

A fluid reservoir for a vehicle tandem master cylinder is made of a resin material and provided therein with first and second fluid chambers for supplying fluid to the cylinder body chambers. A pinched-in portion between the first and second fluid chambers forms a wall between two fluid chambers of reduced area.

3 Claims, 3 Drawing Figures

FLUID RESERVOIRS FOR TANDEM MASTER CYLINDERS

BACKGROUND OF THE INVENTION

This invention relates to a fluid reservoir made of a resin material for a tandem master cylinder and, particularly to an improvement of a fluid reservoir for a tandem master cylinder provided in a vehicle.

It has recently been proposed that in order to reduce the weight of a vehicle brake master cylinder assembly the reservoir portion thereof is made of a synthetic resin material, such as polypropylene or polyamide, and secured to a master cylinder body made of a metallic material, such as aluminium or iron.

However, ordinary resin material is deformed by heat. If the above-mentioned proposal is adopted, therefore, the resin reservoir will be affected by for example heat emitted from the engine and expand at a high rate thereby causing a large deformation of the reservoir by the temperature of the surrounding cylinder and since the reservoir and the cylinder body have different thermal coefficients of heat, the fluid tight connection may be damaged, thus obstructing brake operation. Particularly, in case of the reservoir for the tandem master cylinder having two fluid chambers disposed along the length of the cylinder, the total length of the reservoir is longer than that of a single chamber type reservoir and thus there is a larger amount of longitudinal expansion of the reservoir.

SUMMARY OF THE INVENTION

An object of the present invention is to provide an improved fluid reservoir for a tandem master cylinder in which there are no such drawbacks such as are described above, and the invention provides a fluid reservoir for a tandem master cylinder which is made of a resin material and provided therein with first and second fluid chambers for supplying fluid to first and second chambers of said cylinder. A pinched-in portion between the first and second fluid chambers forms a wall between two fluid chambers having a reduced area. The two fluid chambers may be said to resemble an hour-glass with a connecting wall at the pinched-in waist.

DESCRIPTION OF THE PREFERRED EMBODIMENT

Figure 1:
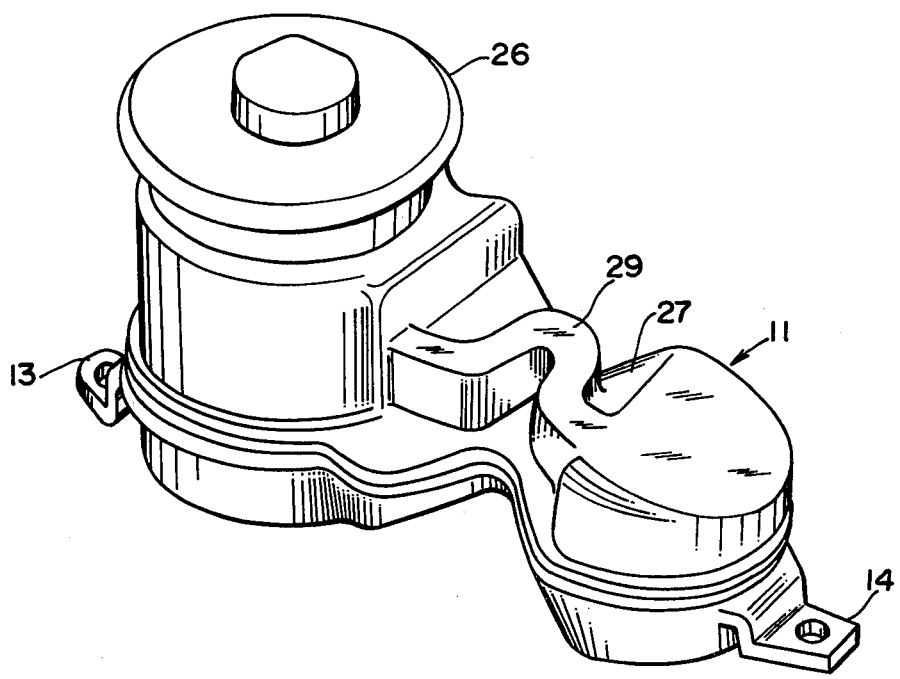
FIG. 1 is a perspective view of an embodiment of a fluid reservoir for a tandem master cylinder in accordance with the present invention.
Figure 2:
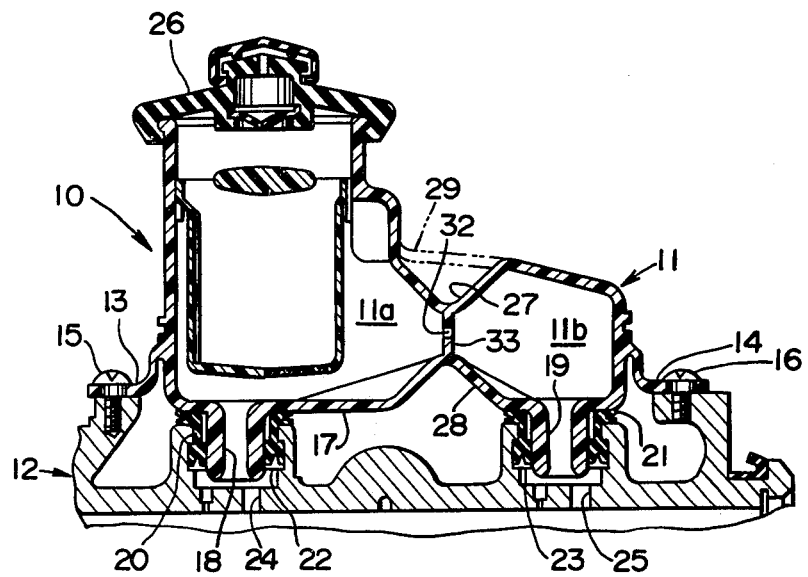
FIG. 2 is a longitudinal section of the reservoir shown in FIG. 1.

Referring to FIGS. 1 and 2, a reference numeral 10 designates a tandem master cylinder assembly for vehicle brake, and the cylinder and piston means of the assembly will not be described, since they are not essential portions of the present invention. The assembly 10 comprises a fluid reservoir 11 made of polypropylene and a cylinder body 12 made of a metal. The reservoir 11 has formed therein two fluid chambers 11a, 11b for containing a hydraulic fluid which is, in use, supplied into the cylinder body 12 to operate the associated brake. Furthermore, the reservoir 11 is formed with a pair of flange portions 13, 14 at its longitudinally opposite ends which are fixed by bolts 15, 16 to adjacent flange portions, respectively, of the cylinder body 12, so that the chambers 11a, 11b are positioned along the length of the cylinder body 12.

A lower wall 17 of the reservoir 11 is integrally provided with a pair of downward cylindrical extensions 18, 19 which are in fluid-tight connection by means of seal members 20, 21 with cavities 22, 23, respectively, of the cylinder body 12. The bottom walls of the cavities 22, 23 are formed with holes 24, 25 through which the cavities are communicated with first and second operating chambers, respectively defined within the cylinder body. With such arrangement, the fluid within the chamber 11a can be directed to the first operating chamber of the cylinder body 12 by way of the cavity 22 and the hole 24, and the fluid within the chamber 11b can also be directed to the second operation chamber of the cylinder body 12 through the cavity 23 and the hole 25.

The reservoir is provided at an upper portion of the chamber 11a with an opening for supplying an additional amount of the fluid thereinto and which is closed by a detachable cap 26 suitably formed of rubber. Furthermore, the intermediate portions of the flange portions 13, 14 are so shaped as to provide flexibility in the flange portions.

Figure 3:
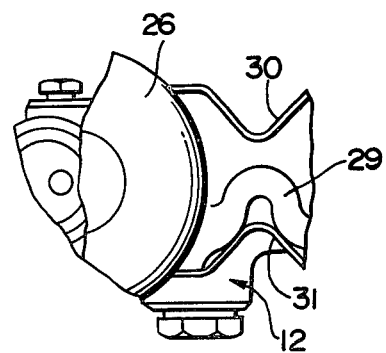
FIG. 3 is a fragmentary plan view of a part of the reservoir of FIG. 1.

At the portion communicating between the chambers 11a and 11b of the reservoir 11, the upper and lower walls thereof are formed to have inwardly inclined portions 27, 28 as clearly shown in section in FIG. 2. Similarly, the opposite side walls of the reservoir are also formed at that portion thereof to have inwardly inclined portions 30, 31 as clearly seen in FIG. 3. The pinched-in portion is provided between two fluid chambers. In this manner, a laterally reduced area is formed within the interior of the reservoir between the chambers 11a and 11b. A partition or wall 33 is provided in the laterally reduced area to divide the chambers from each other. The partition or wall is formed with a through hole 32 which serves to link the chamber 11a and 11b to allow a restricted flow of the fluid from one of the chambers to the other chamber.

The upper portions of the chambers 11a, 11b are communicated by a curved passage 29, so that when an additional amount of fluid is supplied from the upper opening of chamber 11a into the reservoir 11, air existing in the upper interior of the chamber 11b is displaced through the passage 29 to the chamber 11a so that the chamber 11b can be filled with the fluid. The passage 29 is provided in the U-shaped member formed integral with the body of reservoir. The U-shaped member assists in absorbing the thermal expansion of the body of reservoir.

With this arrangement, when the ambient temperature rises the reservoir commences to thermally expand at a relatively larger rate than the metal cylinder thereby tending to cause the outward deformation of the reservoir. Because of the inclined configuration the portion of the reservoir between the two chambers 11a and 11b, however, the longitudinally outward deformation or expansion of the reservoir is substantially absorbed by the longitudinal compression of the inclined portions 27, 28, 30 and 31 to minimize the deformation of the flange portions 13, 14 and the cylindrical extensions 18, 19, so that the flange portions are not damaged and a good fluid-tight connection between the cylindrical extensions 18, 19 and the cavities 22, 23 is maintained.

It will further be understood that a similar effect is brought forth by the above-described arrangement upon the contraction of the reservoir due to the lowering of the ambient temperature. In this case, however, the longitudinal deformation of the reservoir is absorbed by lengthening the inclined portions thereof.

Furthermore, the curved configuration of the passage 29 of the reservoir permits the smooth deformation of the inclined portions in response to the thermal stress caused in the reservoir.

We claim:

1. A fluid reservoir of resin material for a vehicle tandem master cylinder, comprising first and second fluid chambers for supplying fluid to first and second chambers, respectively, of said cylinder, said first and second fluid chambers each having upper, lower and side walls, said upper and lower walls of each said fluid chamber being tapered inwardly and said side-walls of each said fluid chamber being tapered inwardly forming a portion of each said fluid chamber into a substantially truncated pyramid-shape and to form a narrow waist portion of said reservoir including a common wall portion of said reservoir between said first and second fluid chambers, said common wall portion having an area smaller than the cross section of either of said fluid chambers; and an air conduit member integral with said upper walls of said first and second fluid chambers providing air communication between said fluid chambers, said air conduit member being U-shaped proximate said narrow waist portion to provide means for absorbing thermal deformation of said reservoir.

2. A fluid reservoir according to claim 1 wherein said common wall portion has a hole for establishing a restricted communication between said first and second fluid chambers of said reservoir.

3. A fluid reservoir according to any one of claim 2 wherein said first fluid chamber of said reservoir is provided at its upper portion with an opening for filling said first and second fluid chambers of said reservoir with fluid.

* * * * *

UNITED STATES PATENT AND TRADEMARK OFFICE
CERTIFICATE OF CORRECTION

PATENT NO. : 4,200,205
DATED : April 29, 1980
INVENTOR(S) : Masashi Ban et al

It is certified that error appears in the above-identified patent and that said Letters Patent are hereby corrected as shown below:

Column 4, line 17 of Claim 3, change "claim 2" to --claims 1 or 2 --.

Signed and Sealed this

First Day of July 1980

[SEAL]

Attest:

Attesting Officer

SIDNEY A. DIAMOND

Commissioner of Patents and Trademarks